Oct. 27, 1936.                E. STUDT                2,059,055
SUBMARINE CABLE
Filed Oct. 11, 1933
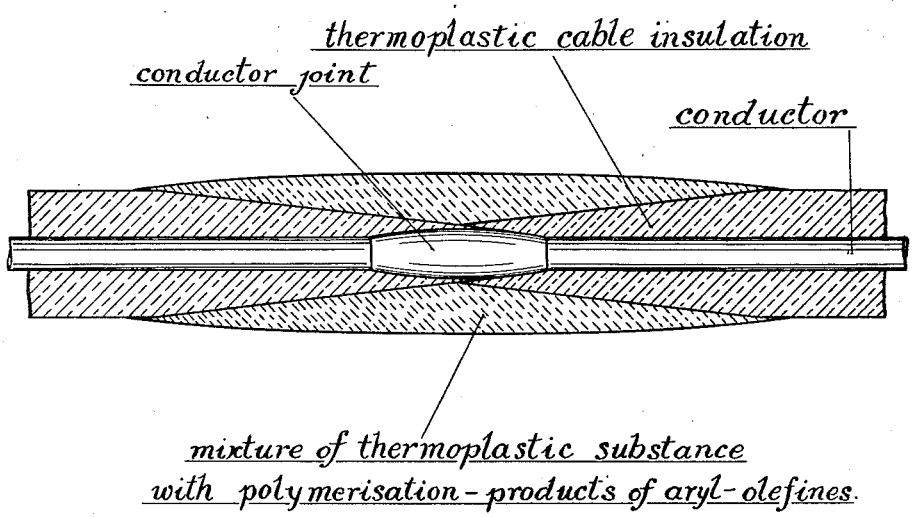
E. Studt
INVENTOR Patented Oct. 27, 1936

2,059,055

UNITED STATES PATENT OFFICE 2,059,055

SUBMARINE CABLE

Ernst Studt, Nordenham, Oldenburg, Germany, assignor to Norddeutsche Seekabelwerke A.-G., Nordenham, Germany Application October 11, 1933, Serial No. 693,215
In Germany October 24, 1932

5 Claims. (Cl. 173—268)

This invention relates to an improved joint in the insulation of submarine cables which are insulated with guttapercha or guttapercha-like materials. The making of such joints in the insulation is one of the most difficult problems in the manufacture of submarine cables. While in the case of guttapercha cables the joints may be made by skilled operatives by hand, it was necessary for the jointing of "Paragutta" cores to work out a special method and to design a special machine in order to obtain perfect adhesion of the surfaces overlapping one another. Hitherto it has not been possible to make perfectly satisfactory joints in "Paragutta" cores by hand. "Paragutta" as defined on page 198 of "Bell System Technical Journal" of April 1932, is a mixture of rubber from which the albumen has been removed, deresined balata and wax.

Now it has been found that a perfectly satisfactory joint can be made in the insulation of "Paragutta" cores without special devices by using as the jointing material a mixture of guttapercha, balata or the like with polystyrol or other polymerization products of aryl olefines. The adhering and adhesive power of a mixture of for instance 85% of deresinated balata with 15% of polystyrol is so great that in all circumstances a perfectly satisfactory and watertight joint will be formed in the case of "Paragutta" cores. If it should be thought necessary to increase the percentage of polystyrol in the mixture in order still further to increase the adhesive power, wax, caoutchouc or some other softening agent should be added to the mixture, as otherwise the total mixture will become too hard.

The employment of the above-mentioned mixtures also provides advantages when making joints in guttapercha cores, as these mixtures are easier to handle than guttapercha alone.

In the drawing one embodiment of the invention is shown and the figure represents a fragmentary view of a cable joint in axial section.

What I claim is:

1. A joint in the insulation of cables which are insulated by a thermoplastic substance consisting of a mixture of albumin-free rubber, deresinated balata and wax, in which the jointing material for the insulation consists of a mixture of such thermoplastic substance with polymerization products of aryl olefines.

2. A joint in the insulation of cables which are insulated by a thermoplastic substance consisting of a mixture of albumin-free rubber, deresinated balata and wax, in which the jointing material for the insulation consists of a mixture of such thermoplastic substance with polystyrol.

3. A joint in the insulation of cables which are insulated by a thermoplastic substance consisting of guttapercha, in which the jointing material for the insulation consists of a mixture of guttapercha with polystyrol.

4. A joint in the insulation of cables which are insulated by a thermoplastic substance consisting of guttapercha containing as additional substances caoutchouc and wax, in which the jointing material for the insulation consists of a mixture of such a thermoplastic substance with polystyrol.

5. A joint in the insulation of cables which are insulated by means of guttapercha, in which the jointing material for the insulation consists of a mixture of 85% deresinated balata and 15% polystyrol.

ERNST STUDT.